(12) United States Patent
Hamid

(10) Patent No.: US 8,601,532 B2
(45) Date of Patent: Dec. 3, 2013

(54) METHOD AND SYSTEM FOR PROVISIONING PORTABLE DESKTOPS

(75) Inventor: Laurence Hamid, Ottawa (CA)

(73) Assignee: Imation Corp., Oakdale, MN (US)

(*) Notice: Subject to any disclaimer, the term of this patent is extended or adjusted under 35 U.S.C. 154(b) by 476 days.

(21) Appl. No.: 12/571,320

(22) Filed: Sep. 30, 2009

(65) Prior Publication Data

US 2011/0078787 A1 Mar. 31, 2011

(51) Int. Cl.
*G06F 21/00* (2013.01)

(52) U.S. Cl.
USPC .......... 726/1; 726/3; 726/18; 713/2; 713/151; 709/218; 380/277; 705/42

(58) Field of Classification Search
USPC ................................. 726/18–19, 1
See application file for complete search history.

(56) References Cited

U.S. PATENT DOCUMENTS

| | | | |
|---|---|---|---|
| 6,249,868 B1 | 6/2001 | Sherman et al. | |
| 6,321,335 B1 | 11/2001 | Chu | |
| 6,370,649 B1* | 4/2002 | Angelo et al. | 726/18 |
| 6,718,463 B1 | 4/2004 | Malik | |
| 6,754,817 B2 | 6/2004 | Khatri et al. | |
| 7,069,433 B1* | 6/2006 | Henry et al. | 713/151 |
| 7,293,166 B2 | 11/2007 | Nguyen et al. | |
| 7,363,363 B2 | 4/2008 | Dal Canto et al. | |
| 7,484,089 B1* | 1/2009 | Kogen et al. | 713/156 |
| 7,512,512 B2 | 3/2009 | Foote et al. | |
| 7,555,568 B2 | 6/2009 | Huang | |
| 7,865,573 B2* | 1/2011 | Tyhurst et al. | 709/218 |
| 7,975,287 B2* | 7/2011 | Hung | 726/2 |
| 8,024,790 B2* | 9/2011 | Zhao et al. | 726/17 |
| 8,065,676 B1* | 11/2011 | Sahai et al. | 718/1 |
| 8,104,088 B2 | 1/2012 | Khilnani et al. | |
| 8,140,869 B2 | 3/2012 | Song et al. | |
| 8,176,153 B2* | 5/2012 | Bose | 709/222 |
| 2002/0087877 A1 | 7/2002 | Grawrock | |

(Continued)

FOREIGN PATENT DOCUMENTS

| | | |
|---|---|---|
| EP | 1 168 235 A2 | 1/2002 |
| GB | 2 420 198 A | 5/2006 |

(Continued)

OTHER PUBLICATIONS

Kevin. "Review: IronKey Secure USB Flash Drive," Oct. 3, 2007, p. 1-5. Retrieved from the Internet: <URL: http://www.geek.com/articles/gadgets/review-ironkey-secure-usb-flash-drive-2007103/> retrieved on Nov. 15, 2012.

*Primary Examiner* — Morshed Mehedi
(74) *Attorney, Agent, or Firm* — Dorsey & Whitney LLP; Kenneth E. Levitt, Esq.

(57) ABSTRACT

A method is disclosed for provisioning of a peripheral portable desktop device. The peripheral portable desktop device is coupled with a workstation. A data file relating to an image for being stored within the peripheral portable desktop device is provided. The image includes secured data that is other than accessible absent user authorization data of a virtual user. Within the peripheral portable desktop device is stored data reflective of the image. A first user is then authorized to the peripheral portable desktop device by providing first user authorization data. For the first user is created a user account secured based on the first user authorization data. The account of the virtual user is accessed via the user account and the user account is configured to access the account of the virtual user upon access to the user account.

27 Claims, 3 Drawing Sheets

(56) References Cited

U.S. PATENT DOCUMENTS

| | | | |
|---|---|---|---|
| 2002/0188565 A1* | 12/2002 | Nakamura et al. | 705/42 |
| 2003/0101246 A1 | 5/2003 | Lahti | |
| 2003/0195950 A1 | 10/2003 | Huang et al. | |
| 2003/0216136 A1 | 11/2003 | McBrearty et al. | |
| 2004/0019778 A1 | 1/2004 | Gere | |
| 2004/0095382 A1 | 5/2004 | Fisher et al. | |
| 2004/0103288 A1 | 5/2004 | Ziv et al. | |
| 2005/0193188 A1 | 9/2005 | Huang | |
| 2005/0235045 A1 | 10/2005 | Narayanaswami et al. | |
| 2006/0080540 A1 | 4/2006 | Arnon et al. | |
| 2006/0085845 A1* | 4/2006 | Davis et al. | 726/6 |
| 2006/0130004 A1 | 6/2006 | Hughes et al. | |
| 2006/0200679 A1* | 9/2006 | Hawk et al. | 713/183 |
| 2007/0016743 A1 | 1/2007 | Jevans | |
| 2007/0101118 A1 | 5/2007 | Raghunath et al. | |
| 2007/0143837 A1 | 6/2007 | Azeez et al. | |
| 2007/0300220 A1* | 12/2007 | Seliger et al. | 718/1 |
| 2008/0016005 A1* | 1/2008 | Owen et al. | 705/73 |
| 2008/0022393 A1* | 1/2008 | Waltermann et al. | 726/18 |
| 2008/0052528 A1* | 2/2008 | Poo et al. | 713/186 |
| 2008/0052770 A1* | 2/2008 | Ali et al. | 726/9 |
| 2008/0052776 A1 | 2/2008 | Prabhat et al. | |
| 2008/0172555 A1 | 7/2008 | Keenan | |
| 2008/0215796 A1 | 9/2008 | Lam et al. | |
| 2008/0293450 A1* | 11/2008 | Ryan et al. | 455/556.2 |
| 2009/0132816 A1 | 5/2009 | Lee | |
| 2009/0210794 A1 | 8/2009 | Pendse et al. | |
| 2009/0260071 A1* | 10/2009 | Sadovsky et al. | 726/9 |
| 2009/0300710 A1* | 12/2009 | Chai et al. | 726/1 |
| 2009/0319782 A1 | 12/2009 | Lee | |
| 2010/0036973 A1 | 2/2010 | Mardiks et al. | |
| 2010/0251328 A1* | 9/2010 | Syed et al. | 726/1 |
| 2011/0078347 A1 | 3/2011 | Hamid | |
| 2011/0078428 A1 | 3/2011 | Hamid | |
| 2011/0078785 A1 | 3/2011 | Hamid | |

FOREIGN PATENT DOCUMENTS

| | | |
|---|---|---|
| WO | WO 98/04967 A1 | 2/1998 |
| WO | WO 2008/122755 A1 | 10/2008 |
| WO | WO 2011/038502 | 4/2011 |
| WO | WO 2011/038503 | 4/2011 |
| WO | WO 2011/038504 | 4/2011 |
| WO | WO 2011/038505 | 4/2011 |
| WO | WO 2011/057409 | 5/2011 |

* cited by examiner

METHOD AND SYSTEM FOR PROVISIONING PORTABLE DESKTOPS

FIELD OF THE INVENTION

The present invention generally relates to the field of provisioning of electronic devices and more particularly to provisioning of devices supporting portable personalized desktop functionality.

BACKGROUND

The concept of a portable desktop is well known in the field of data processing systems and data processing networks. A portable desktop generally refers to personal desktop that a user can recreate on any of a number of computers, for example connected to a network. Implied by the term personal desktop is the private data associated with each user including, for example, email, appointments, personal files, and the like. By enabling users to use a greater number of devices without sacrificing the benefits of a familiar and personalized interface, portable desktops have the potential to expand mobility and convenience, greatly. Typically, portable desktops are achieved by storing within a network a personalized file system or directory for each user. In order to enable a user's desktop, files and home directory to be portable, the user's file system or disk is networked within the network. This model, unfortunately, can lead to security lapses in which, for example, a root system administrator snoops and reads a user's personal email, files, etc.

One attempt to address this problem contemplates distributing a personal data device drive to each user. The user's personal directory is stored on the personal drive. When the user connects to the network using a particular computer, the personal drive is inserted into an appropriate slot of the machine. After "hot plugging" the drive into the machine, a network workstation mounts the personal directory on the personal drive and provides a personalized interface to the user. It will be appreciated, however, that the cost and inconvenience associated with requiring users to perform field installs and disk drive configurations every time they wish to access their portable disks makes this solution impractical. Further, the software for each computer supporting the personal desktop application is custom and therefore limits use of the personal desktop and all data associated therewith.

In order to overcome this, it is presently proposed to store the portable desktop application and data on a portable peripheral storage device. Though this addresses issues of portability and usability, it is difficult to manage such a system when many users are being managed under a single management.

For example, if 10,000 users were each to be provided with portable desktops for their work at a same company, the portable desktop operating system and data must be installed 10,000 times. Each install will occupy a host computer and hours of time. Even if 30 computers were executing installs in parallel and it only took 1 hour to install the Operating System (O/S) and software, the resulting provisioning would require 333 man hours or 8 weeks of someone only doing provisioning. In reality, the installation process takes longer as many portable devices are limited in data access rates relative to for example, internal hard drive data access rates. This leaves an IT department's resources heavily burdened with supporting provisioning and is therefore impractical.

It would be desirable, therefore, to provide a system and method supporting benefits of personalized and portable desktops without sacrificing security and without incurring the cost and inconvenience of the prior art.

SUMMARY OF EMBODIMENTS OF THE INVENTION

In accordance with the invention there is provided a method of pre-provisioning a plurality of peripheral portable desktop devices comprising: providing the plurality of peripheral portable desktop devices; providing a data file relating to an image for being stored within the peripheral portable desktop devices, the image including secured data that is other than accessible absent user authorization data of a virtual user; and, storing in parallel within each of the plurality of peripheral portable desktop devices approximately same data reflective of the image.

In accordance with another aspect of the invention there is provided a peripheral portable desktop device comprising: a housing; a port for coupling with a host computer; a data storage medium having portable desktop data stored therein comprising secured data for a user account of a virtual user, the secured data other than accessible absent user authorization data of a virtual user, the user authorization data of the virtual user for use in a final process for provisioning of the portable desktop device, wherein the portable desktop is executable only once provisioned to a first user other than the virtual user.

In accordance with another embodiment of the invention there is provided a method of provisioning a peripheral portable desktop device comprising: receiving a pre-provisioned peripheral portable desktop device, the peripheral portable desktop device having data stored therein including secured data within a virtual user account that is other than accessible absent user authorization data of a virtual user; authorizing a first user to the peripheral portable desktop device; and modifying an account of the virtual user such that the virtual user account is secured based on the authorization data.

In accordance with another embodiment of the invention there is provided a method of provisioning a peripheral portable desktop device comprising: receiving a pre-provisioned peripheral portable desktop device, the peripheral portable desktop device having data stored therein including secured data that is other than accessible absent user authorization data of a virtual user; authorizing a first user to the peripheral portable desktop device by providing first user authorization data; creating a user account for the first user, the user account secured based on the first user authorization data; accessing the account of the virtual user via the user account; and, configuring the user account to access the account of the virtual user upon access to the user account.

In accordance with another embodiment of the invention there is provided a method of provisioning a peripheral portable desktop device comprising: providing the peripheral portable desktop device; storing within the peripheral portable desktop device data reflective of an image including secured data that is other than accessible absent user authorization data of a virtual user; authorizing a first user to the peripheral portable desktop device by providing first user authorization data; creating a user account for the first user, the user account secured based on the first user authorization data; accessing the account of the virtual user via the user account; and, configuring the user account to access the account of the virtual user upon access to the user account.

BRIEF DESCRIPTION OF THE DRAWINGS

Other objects and advantages of the invention will become apparent upon reading the following detailed description and upon reference to the accompanying drawings in which.

DETAILED DESCRIPTION OF EMBODIMENTS OF THE INVENTION

Figure 1:
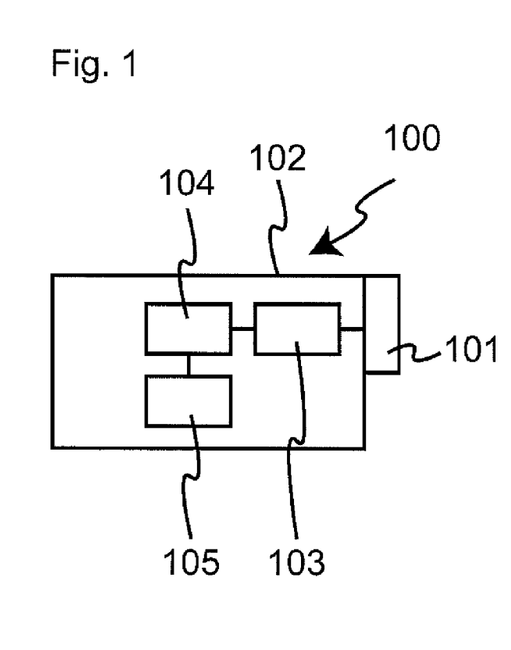
FIG. 1 is a simplified block diagram of a portable peripheral memory storage device in the form of a universal serial bus (USB) memory key.

Referring to FIG. 1, shown is a prior art portable peripheral memory storage device 100. The device comprises a USB connector 101 and a housing 102. When the USB connector 101 is coupled to a mating connector on a host computer in the form of a personal computer (not shown), data is exchanged between the portable peripheral memory storage device 100 and the host computer. The USB communication circuit 103 communicates with another USB communication circuit within the host computer. The USB communication circuit 103 further communicates with processor 104 in the form of a microcontroller. The processor in turn communicates with static random access memory (static RAM) 105 within the portable peripheral memory storage device 100.

When powered on, the prior art peripheral memory storage device commences interactions with a host computer system from which it draws power. The interactions allow the host computer system to mount the portable peripheral memory storage device 100 for access as a memory storage device by the host computer system. Thus, the portable peripheral memory storage device 100, for example, appears as a storage device listed with other storage devices of the host computer. It is known to then store data on or retrieve data from the portable peripheral memory storage device 100. Removing the portable peripheral memory storage device 100 from the host computer system allows for portability of any of the data stored therein to another host computer either locally or wherever the portable peripheral memory storage device 100 is taken.

Such a portable peripheral memory storage device 100 can be used for supporting a portable desktop. In this regard, when inserted prior to booting of the host computer, upon booting thereof, the local hard disk drive is disabled and the host computer is booted from the peripheral memory storage device 100. Thus, the desktop—operating system and user interface—that a user is provided is portable.

Figure 2:
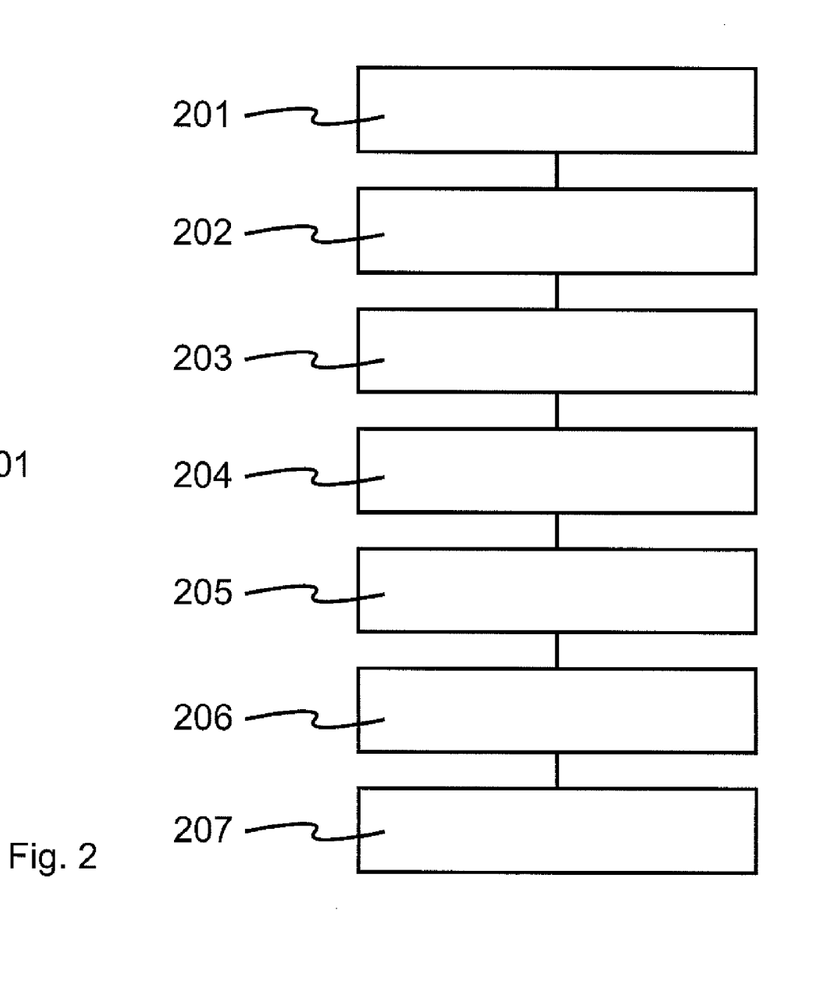
FIG. 2 is a simplified flow diagram for a method of provisioning a portable desktop device.

Referring to FIG. 2, a method of provisioning the portable peripheral memory storage device 100 is shown. The device is coupled with a host computer system at 201. At 202, an optical disk comprising a portable desktop operating system, for example Windows® for portable desktops, is inserted into an optical disk reader coupled with the host computer system. A user of the host computer system then at 203 executes an installer application to install the portable desktop operating system onto the peripheral memory storage device 100. The installation process for operating system software is well known and will not be described in detail except to say that it is time consuming and often requires the user of the computer system to respond to queries.

Once the portable desktop operating system is installed, at 204 the host computer system is rebooted and at 205 the portable desktop operating system is executed. On first execution, the portable desktop operating system provides the user of the host computer system with an opportunity to customize the operating system at 206. For example, the user sets up their own account and password. Once the first execution of the portable desktop operating system is completed, the user is then able to install software on the device at 207.

As is evident to anyone who has installed an operating system on a computer, this is a time consuming process which often requires more than 30 minutes when performed to a hard disk drive and would require significantly more time if installed to a static random access memory (RAM) device via a serial bus interface. The installation of software onto the device will also require time.

Further, when provisioning for a large enterprise it is also important to track software licenses and use which is difficult if each user provisions their own portable desktop. As such, it is often desired to have a central group provision all operating system and application software. This, of course, does not address the issue of how time consuming provisioning is.

A further complication exists when security is an issue. If the IT department provisions each peripheral portable desktop device, then it would be advantageous if those devices were secured until they were allocated and provided to each user. It would be unfortunate if someone tampered with the devices thereby compromising security of an organization.

Figures 3, 4:
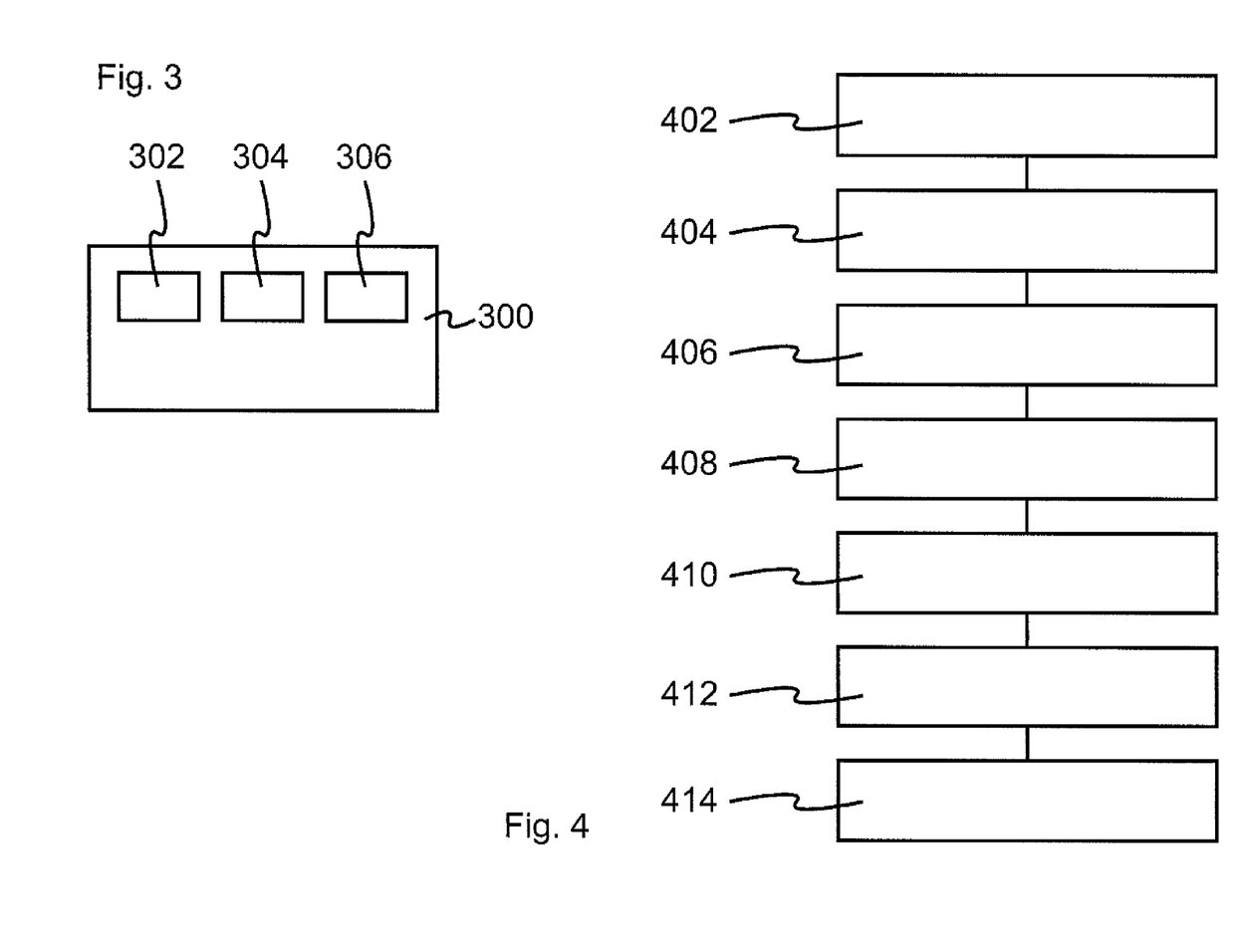
FIG. 3 is a simplified memory diagram for a portable desktop device supporting virtualisation of a desktop.
FIG. 4 is a simplified flow diagram for a method of provisioning a portable desktop device.

Referring to FIG. 3, a simplified memory block diagram of a pre-provisioned peripheral memory storage device 300 is shown. The peripheral memory storage device 300 comprises a user account data space 302 provisioned and installed. The user account data space 302 is associated with a portable desktop operating system memory space 304 and an application memory space 306. Thus, the user account data space is functional to operate the portable desktop.

The user account data stored within the peripheral memory storage device 300 is for a virtual user—a user that does not necessarily exist. The user account, however, is secured to the virtual user and, therefore, not prone to simple security attacks. Thus, the peripheral memory storage device 300 is not usable by any generic user since it is secured to the virtual user.

Referring to FIG. 4, a simplified flow diagram of a final provisioning process is shown. A new pre-provisioned peripheral memory storage device 300 is coupled to a host computer at 402. The host computer is then booted at 404 and a first user who is to receive the peripheral memory storage device 300 provides authentication data in the form of fingerprint information thereto at 406. Alternatively, other authentication data such as a password, a voiceprint, a retinal scan, etc. is provided to the peripheral memory storage device 300. The peripheral memory storage device 300 then at 408 creates a user account for the first user secured by the authentication data provided. Data for accessing the account of the virtual user is stored within the user account at 410 and secured by the authentication data. Thus, by authenticating to the device at 412, the first user—the real user—has access to the preinstalled operating system and applications of the virtual user. At 414, the first user then customizes the applications and operating system for themselves and the peripheral memory storage device 300 is set up. Alternatively, the customization is automated as part of the final process for provisioning the peripheral memory storage device 300.

In order to access the user data of the virtual user, a password is provided from the host system to the peripheral memory storage device 300. Alternatively, the password is provided automatically by the authentication process. Further alternatively, the password is manually provided by an administrator.

For example, the password is a same password across all pre-provisioned peripheral memory storage devices such that a software application can unlock the virtual user account and change the virtual user password. Alternatively, the password is an encoded version of an identifier of the peripheral memory storage device 300, for example a hash of a serial number thereof. When this is the case, knowledge of the encoding process allows for the password to be determined by retrieving the serial number from the peripheral memory storage device 300, for example, by a software process in execution on the host computer system. Further alternatively, the password is determined by a secure device such as a dongle or by a key escrow service or key database.

Once the first user account is set up, typically the password for the virtual user is changed to a long random or difficult to predict and somewhat unique password. Thus, even the provisioning software or device no longer has access to the peripheral memory storage device 300 via the pre-provisioning password.

Optionally, the new password is stored in the peripheral memory storage device 300 within an administrative memory space accessible by an administrator in case the first user access authorization information is forgotten or damaged or in case the first user is no longer available. Alternatively, the new password is provided to a password database or to a password escrow service.

For example, when the portable desktop data is stored within the virtual user account and if the first user is no longer available, the device can be re-provisioned by setting up another account that accesses the virtual user account so long as the administrator has access to the password for the virtual user account.

When a single portable desktop is to be shared, multiple user accounts are set up each accessing a same virtual user account. As such, all changes are shared between users of a same portable desktop device. Alternatively, when the users do not share any aspect of the portable desktop, pre-provisioning optionally provides numerous virtual user accounts within same device or alternatively, numerous separate portable desktop memory partitions within a same device. During the final provisioning process, each partition or each virtual user account is separately associated with different authentication data.

Figure 5:
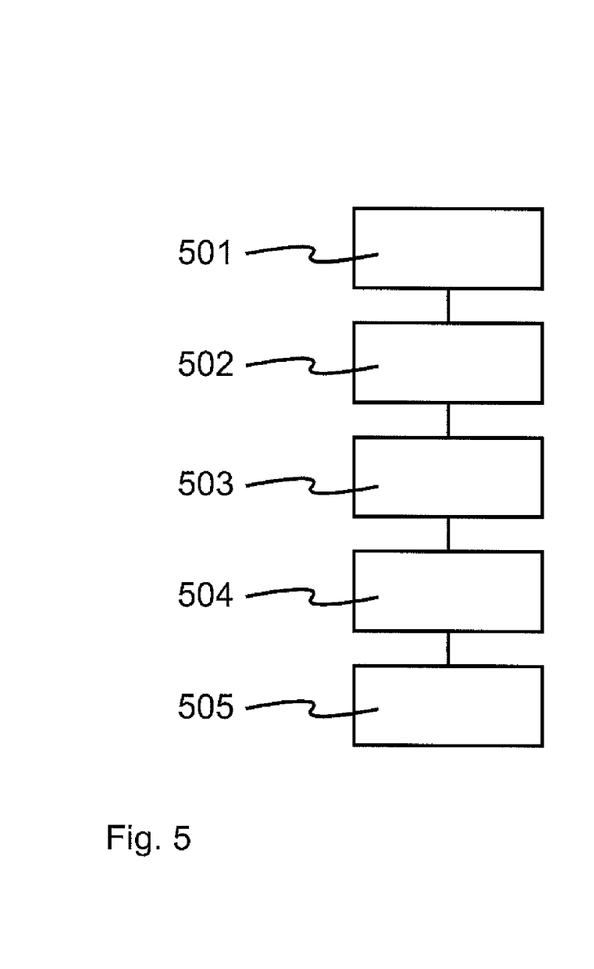
FIG. 5 is a simplified flow diagram for a method of pre-provisioning a plurality of portable desktop devices; and, FIG. 6 is a simplified flow diagram for a method of performing a final process for provisioning a portable desktop device.

Referring to FIG. 5, a simplified flow diagram of a provisioning method is shown for pre-provisioning many devices within a short timeframe. At 501, the devices are inserted in parallel to a device data writer. An image of the pre-provisioned operating system and applications with the virtual user data is provided for storage within the device at 502. The image is then stored within all of the devices in parallel at 503.

Once the data is stored in parallel, each device is optionally customized by writing therein a new password for the virtual user account at 504. For example, a password relating to the serial number of each device is stored. Alternatively, the devices all are pre-provisioned with an identical password. The devices are then be removed at 505 having a pre-provisioned version of the operating system and application data stored thereon in a secure fashion with a secure user account. What would have taken hours before for each peripheral memory storage device now takes little time for many devices. Optionally, the data is stored within the static RAM of the peripheral memory storage device directly either before or after manufacturing such that the computer interface, for example the universal serial bus (USB) interface, is bypassed. Since the static RAM in each device is capable of being written in parallel in the first pass, the integrated circuits can be programmed before manufacturing of the peripheral memory storage device therewith.

The pre-provisioned device is optionally at any desired stage of installation. In an embodiment, the pre-provisioned device has an image of the virtual user account having already been executed for a first time such that all the application data and installation data is ready for execution. Alternatively, the device is pre-provisioned with an image before the first operating system execution allowing each user to execute their portable desktop for the first time. Further alternatively, the device is pre-provisioned with software for installing the portable desktop and applications in response to a user authenticating to the device during the final process of provisioning.

Figure 6:
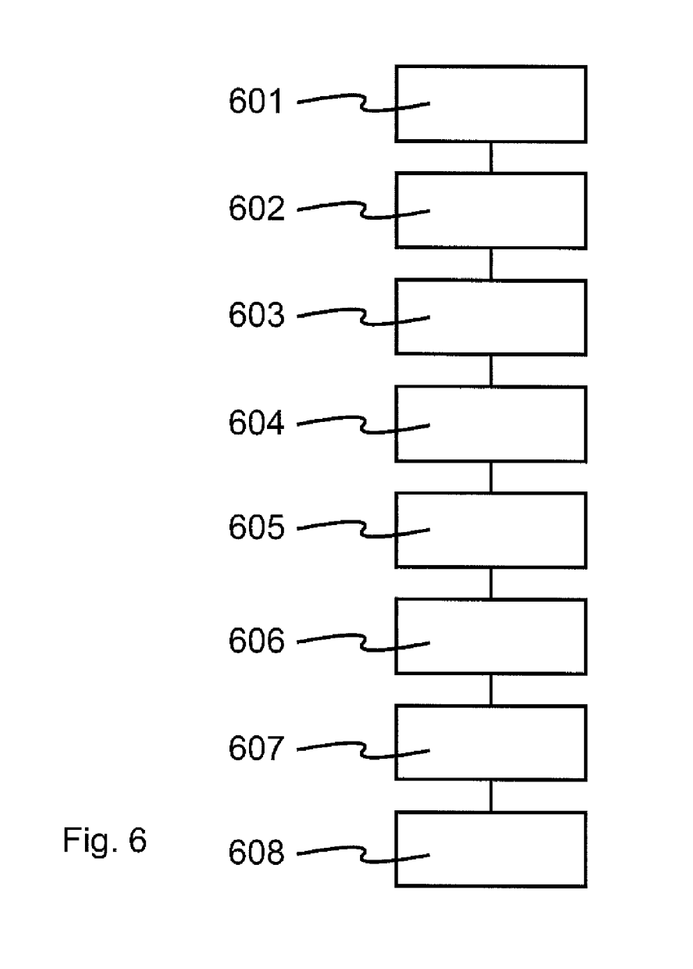

Referring to FIG. 6, a simplified flow diagram of another method of performing the final process of provisioning is shown. Here the peripheral memory storage device 300 is powered other than by a host computer at 601. The peripheral memory storage device 300 is pre-provisioned with pre-provision authentication data for the virtual user that is accessible to the administrative user who provisions the device. For example, an administrator of the organization has the devices pre-provisioned with virtual user security secured by their fingerprint. Alternatively, another biometric, a password, or a secure hardware device is used to secure the virtual user security. The first user provides their authentication information in the form of a fingerprint to the device at 602. At 603, the device forms an account for the first user secured by the authentication information. The administrative user at 604 provides the pre-provision authentication data or information for accessing the pre-provision authentication data to the device, and at 605 the first user account is then provided access to the virtual user account. The password for the virtual user account is then changed at 606 and the changed password is stored at 607 within the first user account data to provide access to the account of the virtual user whenever the first user authenticates to the device. Optionally as shown at 608, the changed password is stored in association with the pre-provision authentication data.

By securing the pre-provisioned portable desktop device, it is contemplated that secure or sensitive data can be stored therein during pre-provisioning such that once the final process of provisioning is completed, access to the secure or sensitive data is supported. For example, the passwords and access information for each of a company's servers for remotely accessing same are stored within the image written to the device and secured within the virtual user account. Once the final process of provisioning is completed, the first user is capable of accessing the company's servers. Advantageously, the secure or sensitive data is stored in a secure fashion within the device both before and after the final process of provisioning is performed. This enhances flexibility of the pre-provisioning to allow for secure data to be included therein.

Numerous other embodiments may be envisaged without departing from the spirit or scope of the invention.

What is claimed is:
1. A method comprising:
providing an image including secured data for being stored within a plurality of peripheral portable desktop devices, wherein the secured data is other than accessible absent user authorization data of a virtual user;

storing in parallel within each of the plurality of peripheral memory storage devices data reflective of the image, wherein the secured data is stored within a virtual user account of the virtual user;

authorizing a first user account on the peripheral memory storage device based on first user authorization data;

storing the user authorization data of the virtual user in the first user account, such that the first user account is configured to access the virtual user account; and changing the user authorization data of the virtual user from a pre-provisioning value to a changed value, such that the secured data within the virtual user account is secured based on the changed value and the virtual user account is no longer accessible via the pre-provisioning value.

2. The method according to claim 1 wherein the peripheral memory storage devices each comprise a universal serial bus port.

3. The method according to claim 1 wherein the peripheral memory storage devices each comprise a housing.

4. The method according to claim 1 wherein each of the peripheral memory storage devices comprises a processor for preventing access to the secured data stored therein absent the user authorization data of the virtual user.

5. The method according to claim 1 wherein the image comprises portable desktop data relating to the virtual user account, the virtual user account protected by at least one of a password and biometric information.

6. The method according to claim 5 wherein the at least one of a password and biometric information comprises a same password for each of the peripheral memory storage devices.

7. The method according to claim 5 wherein the at least one of a password and biometric information comprises biometric information of an administrator.

8. The method according to claim 5 wherein the at least one of a password and biometric information comprises at least one password and wherein the password of each of the peripheral memory storage devices is different.

9. The method according to claim 8 wherein each password is deterministic based on a hardware identifier of each peripheral memory storage device.

10. The method according to claim 1 wherein the image comprises data relating to a plurality of virtual user accounts associated with different authentication data.

11. A peripheral memory storage device comprising:
a housing;
a port for coupling with a host computer; and
a data storage medium having portable desktop data stored therein comprising secured data stored within a virtual user account of a virtual user, the secured data other than accessible absent user authorization data of the virtual user, the user authorization data of the virtual user for use in provisioning of the peripheral memory storage device,
wherein the portable desktop is executable only once provisioned to a first user other than the virtual user, the first user having a first user account authorized based on first user authorization data;
wherein the user authorization data of the virtual user is stored in the first user account, such that the first user account is configured to access the secured data in the virtual user account; and
wherein the user authorization data of the virtual user is changed from a pre-provisioning value to a changed value, such that the secured data in the virtual user account is secured based on the changed value and the virtual user account is no longer accessible via the pre-provisioning value.

12. The peripheral memory storage device according to claim 11 wherein the port comprises a universal serial bus port.

13. The peripheral memory storage device according to claim 11 comprising a processor for communicating with a host computer system coupled to the port and for securing the portable desktop data absent the user authorization data of the virtual user.

14. The peripheral memory storage device according to claim 13 comprising a user authentication data input port for receiving the first user authorization data of the first user independent of the host computer system coupled to the port.

15. A method comprising:
receiving a peripheral memory storage device, the peripheral memory storage device having data stored therein including secured data within a virtual user account that is other than accessible absent user authorization data of a virtual user;
authorizing a first user to the peripheral memory storage device based on first user authorization data;
modifying the virtual user account by changing the user authorization data of the virtual user from a pre-provisioning value to a chanted value, such that the secured data within the virtual user account is secured based on the changed value of the user authorization data of the virtual user, and such that the virtual user account is no longer accessible via the pre-provisioning value; and
storing the user authorization data of the virtual user in the first user account, such that the first account is configured to access the secured data in the virtual user account.

16. A method comprising:
receiving a peripheral memory storage device, the peripheral memory storage device having data stored therein including secured data in a virtual user account of a virtual user, such that the secured data is other than accessible absent user authorization data of the virtual user;
authorizing a first user to the peripheral memory storage device by providing first user authorization data;
creating a first user account for the first user, the first user account secured based on the first user authorization data;
configuring the first user account to access the virtual user account of the virtual user upon access to the first user account by storing the user authorization data of the virtual user in the first user account; and
changing the user authorization data of the virtual user from a pre-provisioning value to a changed value, such that the secured data within the virtual user account is secured based on the changed value and the virtual user account is no longer accessible via the pre-provisioning value.

17. The method according to claim 16, wherein changing the user authorization data of the virtual user comprises changing the pre-provisioning value to second user authorization data comprising the changed value.

18. The method according to claim 17 wherein changing the user authorization data of the virtual user comprises generating one of a random and a pseudorandom password to use as the second user authorization data.

19. The method according to claim 17 comprising storing the second user authorization data within an administrator section of the peripheral memory storage device.

20. The method according to claim 17 comprising providing the second user authorization data for storage outside the peripheral memory storage device.

21. The method according to claim 16 wherein the first user authorization data comprises fingerprint data.

22. The method according to claim 16 comprising authenticating an administrator to the peripheral memory storage device for accessing the virtual user account.

23. The method according to claim 16 comprising retrieving from the peripheral memory storage device an identifier value and deterministically based on the identifier value determining the user authorization data of the virtual user for accessing the virtual user account.

24. The method according to claim 16 comprising:
  authorizing a second user to the peripheral memory storage device by providing second user authorization data;
  creating a second user account for the second user, the second user account secured based on the second user authorization data; and,
  configuring the second user account to access the virtual user account of the virtual user upon access to the second user account.

25. A peripheral memory storage device comprising:
  non-volatile memory for storing portable desktop data reflective of an operating system image including secured data stored within a virtual user account of a virtual user, such that the secured data is other than accessible absent user authorization data of the virtual user; and
  a processor for:
    authorizing a first user to the peripheral memory storage device by providing first user authorization data;
    creating a first user account for the first user, the first user account secured based on the first user authorization data;
    configuring the first user account to access the secured data stored within the virtual user account of the virtual user upon access to the first user account, wherein the user authorization data of the virtual user is stored in the first user account;
    changing the user authorization data of the virtual user from a pre-provisioning value to a changed value, such that the secured data within the virtual user account is secured based on the changed value and the virtual user account is no longer accessible via the pre-provisioning value; and
    accessing the secured data within the virtual user account of the virtual user via the first user account using the changed value of the user authorization data of the virtual user.

26. The peripheral memory storage device according to claim 25, wherein the processor is configured for changing the user authorization data of the virtual user from the pre-provisioning value to a changed value comprising one of a random password and a pseudorandom password.

27. The peripheral memory storage device according to claim 25, wherein the processor is configured for changing the user authorization data of the virtual user from the pre-provisioning value to a changed value comprising an encoded version of a hardware identifier of the peripheral memory storage device.

* * * * *

UNITED STATES PATENT AND TRADEMARK OFFICE
CERTIFICATE OF CORRECTION

Page 1 of 1

PATENT NO.         : 8,601,532 B2
APPLICATION NO.    : 12/571320
DATED              : December 3, 2013
INVENTOR(S)        : Laurence Hamid It is certified that error appears in the above-identified patent and that said Letters Patent is hereby corrected as shown below:

Claims

| Column | Line | | Should Be |
|---|---|---|---|
| 8 | 26 | "value to a chanted value, such that" | —value to a changed value, such that— |

Signed and Sealed this
Eighth Day of April, 2014

Michelle K. Lee
*Deputy Director of the United States Patent and Trademark Office*